US007799240B1

(12) United States Patent  
Roberts et al.

(10) Patent No.: US 7,799,240 B1  
(45) Date of Patent: *Sep. 21, 2010

(54) REFRIGERANT COMPOSITIONS

(75) Inventors: Neil Andre Roberts, Bristol (GB); Owen Ross Chambers, Watford Hertfordshire (GB)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,077

(22) Filed: Jul. 12, 2007

Related U.S. Application Data

(62) Division of application No. 10/530,873, filed as application No. PCT/GB03/04421 on Oct. 13, 2003, now Pat. No. 7,276,176.

(30) Foreign Application Priority Data

Oct. 11, 2002 (GB) ................................ 0223724.6

(51) Int. Cl.  
*C09K 5/04* (2006.01)
(52) U.S. Cl. .......................................... 252/68; 252/67
(58) Field of Classification Search ............... 252/67, 252/68  
See application file for complete search history.

(56) References Cited

U.S. PATENT DOCUMENTS

| | | | |
|---|---|---|---|
| 4,755,316 A | 7/1988 | Magid et al. | |
| 5,091,600 A * | 2/1992 | Moore et al. | 570/151 |
| 5,520,833 A | 5/1996 | Kaneko | |
| 5,688,432 A | 11/1997 | Pearson et al. | |
| 5,705,086 A | 1/1998 | Ardito et al. | |
| 5,866,030 A | 2/1999 | Reyes-Gavilan et al. | |
| 5,954,995 A | 9/1999 | Globe et al. | |
| 6,000,230 A | 12/1999 | Kanno et al. | |
| 6,065,305 A | 5/2000 | Arman et al. | |
| 6,076,372 A | 6/2000 | Acharya et al. | |
| 6,207,071 B1 | 3/2001 | Takigawa et al. | |
| 6,230,519 B1 | 5/2001 | Arman et al. | |
| 6,251,300 B1 | 6/2001 | Takigawa et al. | |
| 6,253,577 B1 | 7/2001 | Arman et al. | |
| 6,428,720 B1 | 8/2002 | Roberts et al. | |
| 6,511,610 B2 | 1/2003 | Caron et al. | |
| 6,521,141 B1 | 2/2003 | Roberts et al. | |
| 6,526,764 B1 | 3/2003 | Singh et al. | |
| 6,606,868 B1 | 8/2003 | Powell et al. | |
| 6,629,419 B1 | 10/2003 | Powell et al. | |
| 6,655,140 B2 | 12/2003 | Oka et al. | |
| 6,655,160 B2 | 12/2003 | Roberts | |
| 6,695,973 B1 | 2/2004 | Musso et al. | |
| 6,783,691 B1 | 8/2004 | Bivens et al. | |
| 7,258,813 B2 | 8/2007 | Roberts et al. | |
| 7,276,176 B2 * | 10/2007 | Roberts et al. | 252/68 |

| | | |
|---|---|---|
| 2002/0050583 A1 | 5/2002 | Caron et al. |

FOREIGN PATENT DOCUMENTS

| | | |
|---|---|---|
| CA | 2278334 A1 | 1/1999 |
| CN | 1183451 | 6/1998 |
| CN | 1280166 A | 1/2001 |
| EP | 0 399 817 B1 | 11/1990 |
| EP | 0 427 604 B1 | 4/1993 |
| EP | 0 539 952 B1 | 5/1993 |
| EP | 0 659 862 A1 | 6/1995 |
| EP | 0565265 B1 | 12/1995 |
| EP | 1 184 438 B1 | 3/2002 |
| EP | 1 193 305 A1 | 4/2002 |
| EP | 0779352 B1 | 10/2002 |
| EP | 0 856 571 B1 | 4/2003 |
| GB | 2247462 A | 3/1992 |
| GB | 2 250 514 A | 6/1992 |
| GB | 2291884 A | 2/1996 |
| GB | 2 327 427 A | 1/1999 |
| GB | 9923088.0 | 9/1999 |
| GB | 0005043.5 | 3/2000 |
| GB | 0010171.7 | 4/2000 |
| GB | 2 356 867 A | 6/2001 |
| JP | 08157809 A | 6/1996 |
| JP | 2576161 B2 | 1/1997 |
| JP | 2576162 | 1/1997 |
| JP | 2584337 B2 | 2/1997 |
| JP | 1997059611 A | 3/1997 |

(Continued)

OTHER PUBLICATIONS

Butler D., "R22 drip-in a success at BRE", Refrigeration and Air Conditioning, pp. 49-50 (1994).
Fluorocarbon azeotropes Research Disclosure 16265 (1977).
JP 01 139678 (English Translation of the Abstract) (1989).
Pearson SF, "Uses of hydrocarbon refrigerants", I.I.F.-I.I.R. Commissions B1, B2, E1 and E2, pp. 439-446 (1996).
E-mail reply from Herrick Conference to Felix Flohr dated May 27, 2003.

(Continued)

*Primary Examiner*—John R Hardee

(57) ABSTRACT

Refrigerant composition are disclosed which comprises:
(a) pentafluoroethane, trifluoromethoxydifluoromethane or hexafluorocyclopropane, or a mixture of two or more thereof, in an amount of at least 75% based on the weight of the composition,
(b) 1,1,1,2- or 1,1,2,2-tetrafluoroethane, trifluoromethoxypentafluoroethane, 1,1,1,2,3,3-heptafluoropropane or a mixture of two or more thereof, in an amount of from 10 to 20% by weight based on the weight of the composition and
(c) an ethylenically unsaturated or saturated hydrocarbon, optionally containing one or more oxygen atoms, with a boiling point from −50° C. to +35° C., or a mixture thereof in an amount from 1% to 4% by weight based on the weight of the composition the weight ratio of component (a):component (b) being at least 4:1.

10 Claims, 4 Drawing Sheets

FOREIGN PATENT DOCUMENTS

| | | |
|---|---|---|
| JP | 09125052 A | 5/1997 |
| JP | 01108291 | 10/1997 |
| JP | 11181414 A | 7/1999 |
| JP | 3127138 B2 | 1/2001 |
| JP | 2002-228307 | 8/2002 |
| JP | 2002 228307 A | 8/2002 |
| JP | 3754198 B2 | 12/2005 |
| KR | 1997-022058 | 5/1997 |
| RU | 2 072 382 C | 1/1997 |
| RU | 2135541 C1 | 8/1999 |
| RU | 2 161 637 C2 | 10/2001 |
| WO | WO 93/01152 A2 | 1/1993 |
| WO | WO 93/15163 A1 | 8/1993 |
| WO | WO 94/00529 A1 | 1/1994 |
| WO | 95/08602 A1 | 3/1995 |
| WO | 95/08603 A1 | 3/1995 |
| WO | 96/03473 A1 | 2/1996 |
| WO | WO 97 34961 | 9/1997 |
| WO | 98/02370 A1 | 1/1998 |
| WO | WO 00/56834 | 9/2000 |
| WO | WO 01/23491 A1 | 4/2001 |
| WO | WO 01/23492 A1 | 4/2001 |
| WO | WO 01 23493 A1 | 4/2001 |
| WO | WO 02/24829 A1 | 3/2002 |
| WO | WO 02 26912 A | 4/2002 |
| WO | WO 02 26913 A2 | 4/2002 |
| WO | 2004/033582 A1 | 4/2004 |
| WO | 2004/050787 A1 | 6/2004 |

OTHER PUBLICATIONS

Internet citation, "Conference Organizing Committee", http://www.ecn.purdue.edu/Herrick/Events/organize-frame.htm.

Internet citation, "Registration Information", http://www.ecn.purdue.edu/Herrick/Events/Registration.htm.

ASHRAE Standard 34-2001, "Contents", pp. 7 and 13.

Sworn Statement by Christoph Meurer (Sep. 7, 2003).

Birett K, Information sheets on hazardous substances (1996).

Soffientini et al., "Evaluation of alternative refrigerants when retrofitting R-22 refrigeration systems", Centro Studio Galileo—Industria & Formazione Eleventh European Conference, Milan, Italy (2005).

JP 01 139675 (English Translation of the Abstract) (pub. prior to 2002).

Roberts NA, "Determination of the performance, leak scenario, flammability and oil return characteristics of novel R22 replacement", Proceedings of the Seventh International Refrigeration Conference at Purdue University, West Lafayette, Indiana (1998).

Musso E et al., "Miscele ternarie a base di HFC contenenti idrocarburi come sostituti "drop in" di R12 nella refrigerazione domestica", Conference on Conditioning, Heating, Refrigeration: Innovations and Trends, Milan, Italy (1997).

Wilson, DP, Richard, RG; "Determination of Refrigerant Lower Flammability Limits in Compliance with Proposed Addendum p to Standard 34"; ASHRAE Transactions 2002, v. 108; pp. 1-17; Jun. 23, 2002.

Roberts, NA, Pearson, SF; "High Efficiency R22 Replacement (ISCEON 59, a mixture of R125, R134a and isobutane)"; Congress Symposium Meeting-Colloque, 1996 Int. Compressor Eng. Conf., Purdue, Jul. 23, 1996.

Roberts, NA; "Energy Saving Refrigerant Blends Comprising R125, R134a, R600 or R600a"; European Conference (Milan); pp-108; Jun. 17-18, 2005.

"Final Draft International Standard-Projet Final de Norme Internationale", International Electrotechnical Commission, IEC; Dec. 17, 2004.

Test Protocol for Determination of Refrigerant Properties (Description of Equipment; Chart: Position of Thermocouples and Transducers on LT-Calorimeter; Operating Conditions) (prior to 2003 to the best information).

Chart: Vapor Composition Flammability Data (data published Mar. 2006 in EPO opp.0.

English Abstract: JP 01108291 ( Record provided in IDS 1987).

English Abstract: RU 2161637 (Jan. 10, 2001).

R417A—MSDS Sheet (Product available circa 2001).

Sanders PA., "Table 14-2 Flammability Limits of Various Propellants in Air", Handbook of Aerosol Technology, Second Edition, Malabar, Florida, pp. 233, 250 ( 1987).

* cited by examiner

REFRIGERANT COMPOSITIONS

CROSS REFERENCE(S) TO RELATED APPLICATION(S)

This application is a divisional application of U.S. application Ser. No. 10/530,873, filed Aug. 15, 2005 now U.S. Pat. No. 7,276,176, which claims priority to PCT/GB03/04421, filed Oct. 13, 2003, which claims priority to GB 0223724.6, filed Oct. 11, 2002. The contents of all the above applications are incorporated herein by reference in their entirety.

FIELD OF THE INVENTION

The present invention relates to refrigerant compositions, particularly low temperature refrigerants for use in cold stores.

BACKGROUND OF THE INVENTION

There is a need for a low temperature refrigerant for use in cold stores. Prior to the Montreal Protocol, this function was filled by R502, an azeotrope of R115 and R22. This refrigerant was particularly attractive in low temperature situations where R12 ($CCl_2F_2$) or R22 were reaching their effective working limits. At these low temperatures it was possible to achieve a significant increase in capacity over that obtainable with R22 with a major benefit being operation at considerably lower discharge temperatures. However, since R502 contains R115, which is a strong ozone depleter, it is now no longer available for use.

Subsequently, this requirement has been partially met by using two blends containing R143a. The first is R404A, which consists of R125 (44% w/w), R143a (52% w/w) and R134a (4% w/w). The second is R507A, which consists of an azeotropic mixture of R125 (50% w/w) and R143a (50% w/w).

The problem with these blends is that they have very high global warming potentials (GWP).

The concept of a Global Warming Potential (GWP) has been developed to compare the ability of a greenhouse gas to trap heat in the atmosphere relative to another gas. Carbon dioxide ($CO_2$) has been chosen as the reference gas. Since GWPs are ratios, they are dimensionless. The GWPs quoted below are those given in IPCC-1995 for 100 year time horizons. The GWPs for blends are calculated by summing the products of the mass fraction times the individual component's GWP.

A greenhouse gas is a gas that causes the Earths atmosphere to trap heat. The greenhouse gas allows the sun's radiation to reach the Earth's surface. The Earth's surface is heated by this radiation and emits longer wavelength infrared radiation due to the heating. The greenhouse gas now prevents this radiation from escaping back into space by absorbing it and hence traps it in the atmosphere.

R507 has a GWP of 3300 and R404A is only slightly less at 3260. These high GWPs are due to the presence of R143a. Pure R143a has a GWP of 3800 compared to that of the other main component, R125, which is only 2800.

R22 alone has also been used, but this is an ozone depleter that will be phased out over the next decade. Also, the efficiency of R22 at the low temperatures required for cold storage is poor.

There is now considerable concern about global warming and, hence, it is important to use blends with as low a GWP as possible. Clearly there is a need to find a substitute for R502, which is not an ozone depleter, has a low GWP and can operate more efficiently at the low temperatures required than R22, R404A or R507.

SUMMARY OF THE INVENTION

According to the present invention there is provided a refrigerant composition which comprises:

(a) pentafluorethane, trifluoromethoxydifluoromethane or hexafluorocyclopropane, or a mixture of two or more thereof, in an amount of at least 75% based on the weight of the composition, (b) 1,1,1,2- or 1,1,2,2-tetrafluoroethane, trifluoromethoxypentafluoroethane, 1,1,1,2,3,3-heptafluoropropane or a mixture of two or more thereof, in an amount of from 5 to 24% by weight based on the weight of the composition and (c) an ethylenically unsaturated or saturated hydrocarbon, optionally containing one or more oxygen atoms, with a boiling point from −50° C. to +35° C., or a mixture thereof, in an amount from 1% to 4% by weight based on the weight of the composition, the weight ratio of component (a):component (b) being at least 3:1.

The percentages quoted above refer, in particular, to the liquid phase. The corresponding ranges for the vapour phase are as follows:

(a) at least 85%, (b) 2 to 12% and (c) 0.8 to 3%, all by weight based on the weight of the composition. These percentages preferably apply both in the liquid and vapor phases.

The present invention also provides a process for producing refrigeration which comprises condensing a composition of the present invention and thereafter evaporating the composition in the vicinity of a body to be cooled. The invention also provides a refrigeration apparatus containing, as refrigerant, a composition of the present invention.

BRIEF DESCRIPTION OF THE DRAWING FIGURES

DETAILED DESCRIPTION OF PREFERRED EMBODIMENTS

Figure 1:
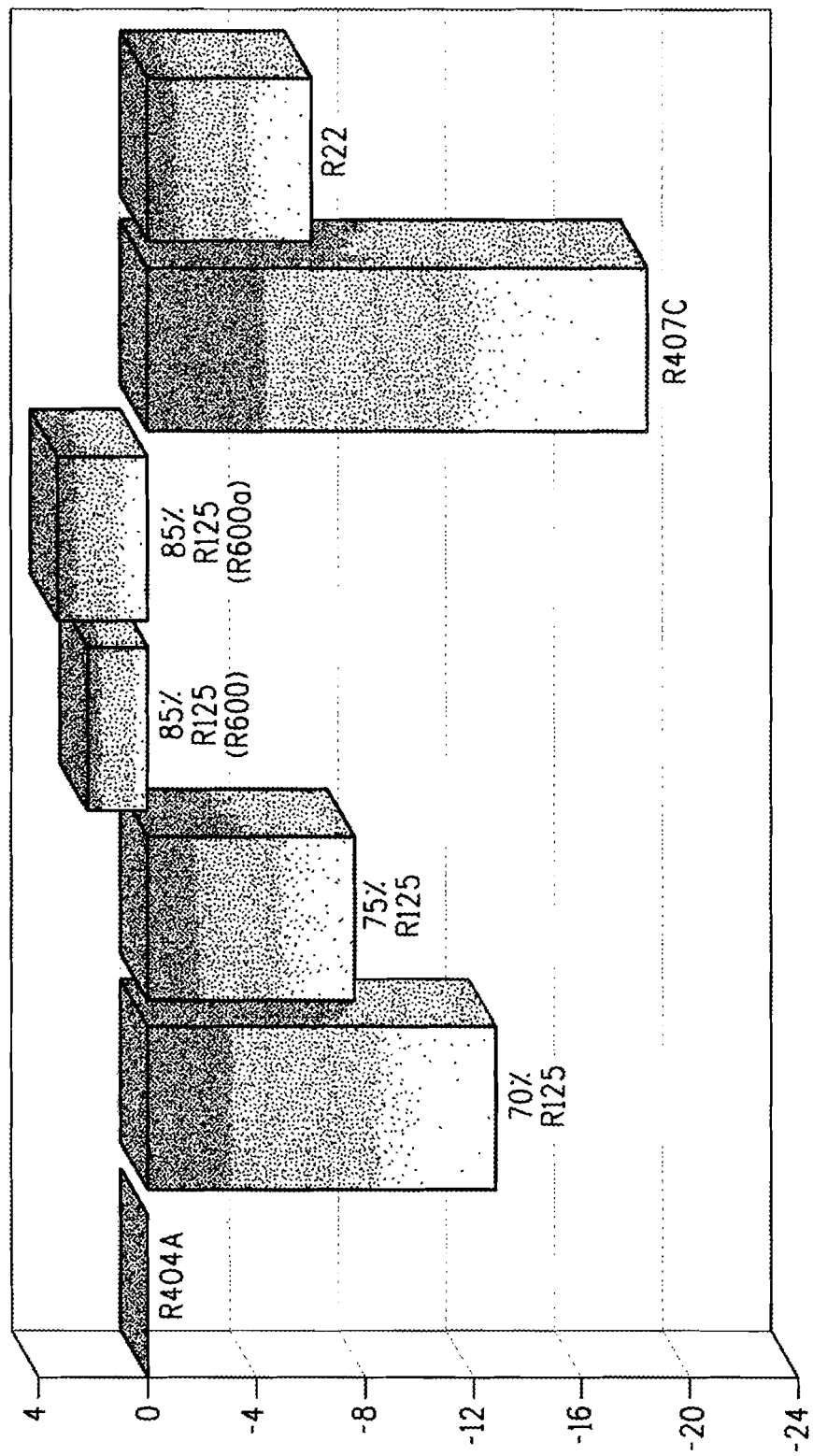
FIG. 1 is a graph showing a comparison of capacities at a mean evaporating temperature of −30° C., compared to R404A.
Figure 2:
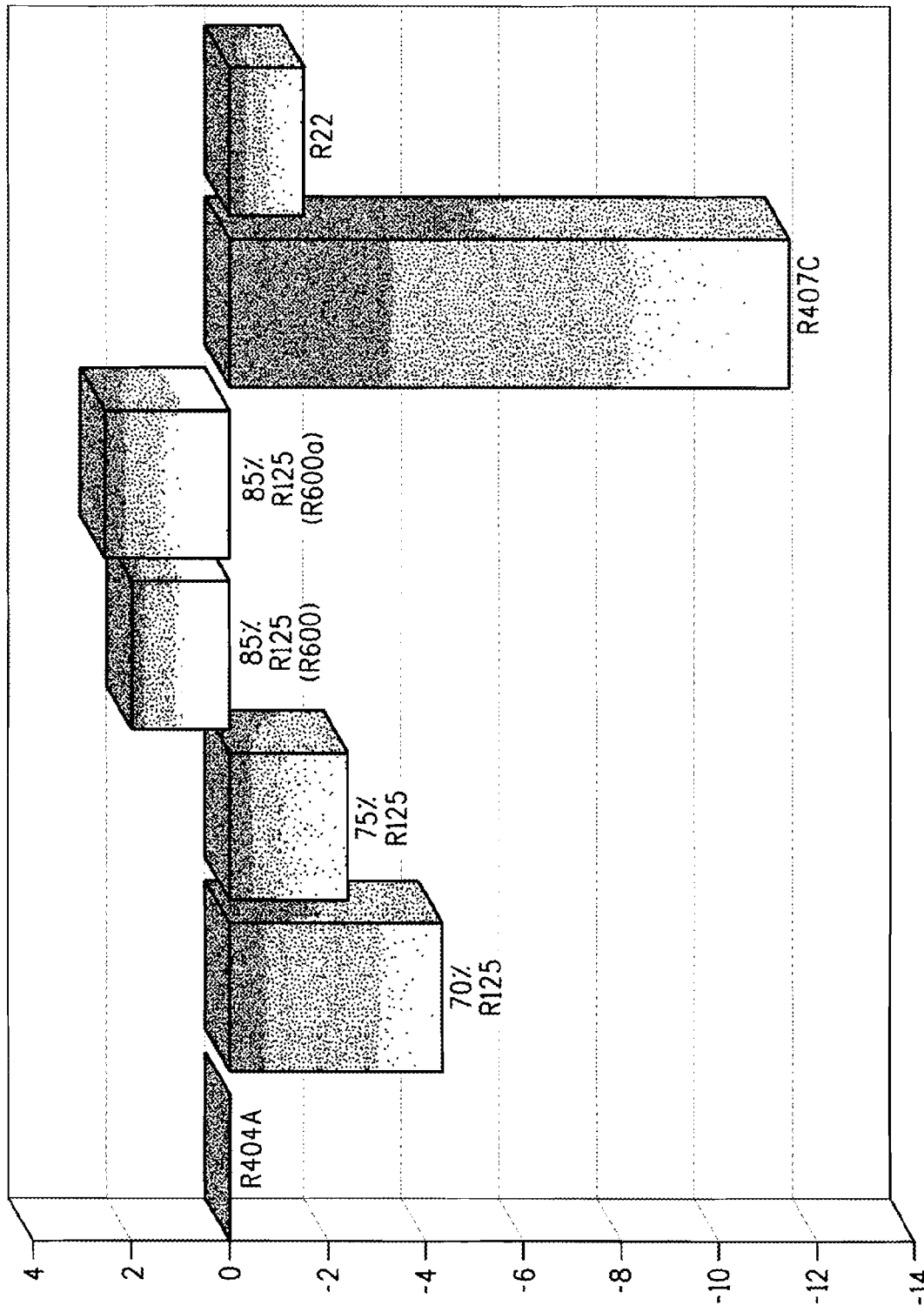
FIG. 2 is a graph showing the COP results obtained.
Figure 3:
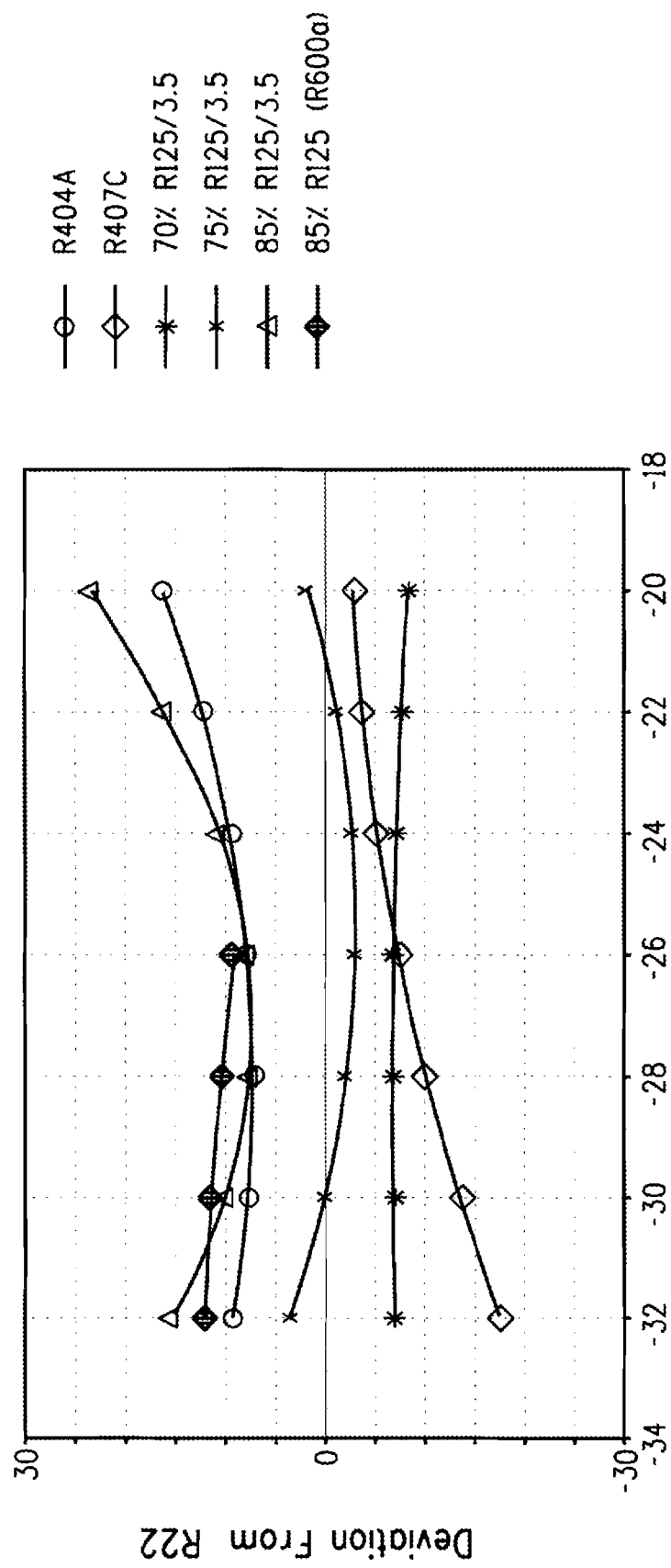
FIG. 3 is a graph showing the deviation in capacity for compositions of the invention.
Figure 4:
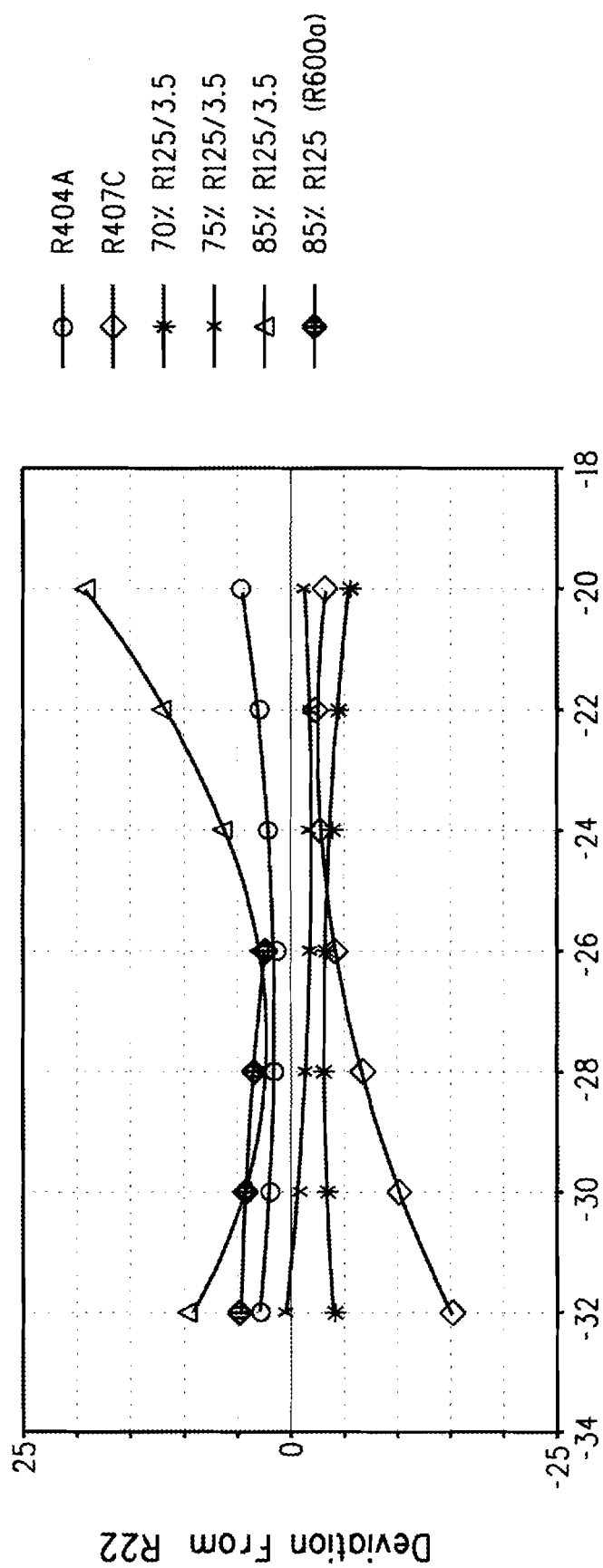
FIG. 4 is a graph showing the deviation in COP for compositions of the invention.

Component (a) is present in an amount of at least 75% by weight based on the weight of the composition. In practice, the concentration will generally be at least 80% by weight with a preferred range of 80 to 90 to % by weight, especially 83 to 88% by weight, in particular about 85% by weight. Preferably, component (a) is R125 (pentafluorethane) or a mixture containing at least a half, especially at least three quarters (by mass) of R125. Most preferably component (a) is R125 (alone). Generally the cooling capacity of the composition increase with increasing R125 content; the best cooling capacity and efficiency can be obtained with about 85% R125.

Component (b) is present in the composition in an amount from 5 to 24% by weight based on the weight of the composition. Typically, the component is present in an amount from 7.5% to 20%, generally 10% to 15%, by weight, especially about 11.5% by weight. Component (b) is preferably a mixture containing at least a half, especially at least three quarters (by mass) of R134a (1,1,1,2-tetrafluoroethane). Most preferably component (b) is R134a (alone).

The weight ratio of component (a):component (b) is at least 3:1, generally at least 4:1, preferably 5:1 to 10:1 and especially 7:1 to 9:1.

Component (c) is a saturated or ethylenically unsaturated hydrocarbon, optionally containing one or more oxygen atoms, in particular one oxygen atom, with a boiling point from −50° C. to +35° C. or a mixture thereof. Preferred hydrocarbons which can be used possess three to five carbon atoms. They can be acyclic or cyclic. Acyclic hydrocarbons which can be used include propane, n-butane, isobutane, pentane, isopentane and dimethyl and ethylmethyl ether as well as propane. Cyclic hydrocarbons which can be used include cyclo butane, cyclopropane, methyl cyclopropane and oxetan. Preferred hydrocarbons include n-butane and isobutane, with iso-butane being especially preferred. Isobutane is particularly suited to producing a non-flammable mixture in a worst case fractionation due to a leak.

The presence of at least one further component in the composition is not excluded. Thus although, typically, the composition will comprise the three essential components, a fourth component, at least, can also be present. Typical further components include other fluorocarbons and, in particular, hydrofluorocarbons, such as those having a boiling point at atmospheric pressure of at most −40° C., preferably at most −49° C., especially those where the F/H ratio in the molecule is at least 1, preferably R23, trifluoromethane and, most preferably, R32, difluoromethane. In general, the maximum concentration of these other ingredients does not exceed 10% and especially not exceeding 5% and more especially not exceeding 2%, by weight, based on the sum of the weights of components (a), (b) and (c). The presence of hydrofluorocarbons generally has a neutral effect on the desired properties of the formulation. Desirably one or more butanes, especially n-butane or iso-butane, represents at least 70%, preferably at least 80% and more preferably at 90%, by weight of the total weight of hydrocarbons in the composition. It will be appreciated that it preferable to avoid perhalocarbons so as to minimise any greenhouse effect and to avoid hydrohalogenocarbons with one or more halogen heavier than fluorine. The total amount of such halocarbons should advantageously not exceed 2%, especially 1% and more preferably 0.5%, by weight.

It has been found that the compositions of the present invention are highly compatible with the mineral oil lubricants which have been conventionally used with CFC refrigerants. Accordingly the compositions of the present invention can be used not only with fully synthetic lubricants such as polyol esters (POE), polyalkyleneglycols (PAG) and polyoxypropylene glycols or with fluorinated oil as disclosed in EP-A-399817 but also with mineral oil and alkyl benzene lubricants including naphthenic oils, paraffin oils and silicone oils and mixtures of such oils and lubricants with fully synthetic lubricants and fluorinated oil.

The usual additives can be used including "extreme pressure" and antiwear additives, oxidation and thermal stability improvers, corrosion inhibitors, viscosity index improvers, pour point depressants, detergents, anti-foaming agents and viscosity adjusters. Examples of suitable additives are included in Table D in U.S. Pat. No. 4,755,316.

The following Examples further illustrate the present invention.

EXAMPLES

Determination of Vapour Pressure/Temperature Relationship for the Blends to be Tested The samples used for testing are detailed in Table 1.

Equipment and Experimental

The equipment used for determining the vapour pressure-temperature relationship consisted of a 1 liter Parr reactor immersed completely in a thermostatically controlled water bath. The bath temperature was measured using a calibrated platinum resistance thermometer with an Isotech TTI1 indicator. The resolution of the thermometer is 0.01° C. The pressure (press) was read with a calibrated pressure transducer with an experimental accuracy of 0.01 bara and read on a Druck DR1 instrument.

Approximately, 1.2 kg of the refrigerant was charged into the Parr reactor. The reactor was then cooled overnight. When it has reached temperature, the pressure and temperatures were recorded every ten minutes until constant.

The data obtained does not give the dew point and hence does not give the glide. An approximate evaluation of the glide can be obtained by using the REFPROP 6 program. The relationship of the glide to the bubble point is usually nearly linear and can be represented by a linear equation. In the case of R4070, a binomial equation had to be used. These equations can now be used to give an approximate glide for the experimentally determined bubble points. This is effectively a normalisation of the calculated glide to the experimentally determined data. The pressure of the dew point can now be approximated by applying the relationship for temperature/pressure, which was found for the bubble point. The glide equations obtained are also shown in Table 2. These equations can now be used to obtain vapour pressure/temperature tables.

Determination of the Performance of the Refrigerants on the Low Temperature (LT) Calorimeter.

Equipment and General Operating Conditions

The performance of the refrigerants was determined on the low temperature (LT) calorimeter. The LT calorimeter is fitted with a Bitzer semi-hermetic condensing unit containing Shell SD oil. The hot vapour passes out of the compressor, through an oil separator and into the condenser. The discharge pressure at the exit of the compressor is kept constant by means of a packed gland shut-off valve. The refrigerant then travels along the liquid line to the evaporator.

The evaporator is constructed from 15 mm Cu tubing coiled around the edges of a well insulated 32 liter SS bath. The bath is filled with 50:50 glycol:water solution and heat is supplied to it by 3×1 kW heaters controlled by a PID controller. A stirrer with a large paddle ensures that the heat is evenly distributed. The evaporating pressure is controlled by an automatic expansion valve.

The refrigerant vapour returns to the compressor through a suction line heat exchanger.

Twelve temperature readings, five pressure readings, compressor power and heat input are all recorded automatically used Dasylab.

The tests were run at a condensing temperature of 40° C. and an evaporator superheat of 8° C. (±0.5° C.).

For R22 the temperature at the end of the evaporator was maintained at 8° C. above the temperature equivalent to the evaporating pressure.

For the other refrigerants the temperature at the end of the evaporator was maintained at 8° C. above the temperature equivalent to the evaporating pressure (Dew point).

The mean evaporator temperature (ev. temp) for these refrigerants was calculated by taking the temperature equivalent to the evaporator pressure from the bubble point table and adding to that half the glide at that temperature.

Initially, the pressure was roughly set and then the temperature of the bath was set. The pressure would then be readjusted to ensure that there was 8° C. superheat present. The superheat was measured from the third evaporator outlet. No adjustments were made during the run, except for possibly minor changes to the valve at the exit of the compressor, in order to keep the conditions as constant as possible. The test was then continued for at least one hour during which time 6 readings were taken i.e. every 10 minutes. If these readings were stable, then their average was calculated.

Specific Experimental Details for Each Refrigerant

The refrigerant list is given in the order in which the measurements were carried out.

R22: R22 (3.477 kg) was charged into the liquid receiver. Since this was the first time that the LT calorimeter had been used since a major modification base data for R22 was required. Accordingly, eight data points were obtained between the evaporating temperatures of −33° C. to −21° C.

75% R125: Approximately 3.54 kg were charged into the liquid receiver. Four data points were obtained between the mean evaporating temperatures of −31° C. to −23° C. respectively. At a mean evaporating temperature of −23° C. the expansion valve was fully opened.

85% R125: Approximately 3.55 kg were charged into the liquid receiver. Four data points were obtained between the mean evaporating temperatures of −31° C. and −25° C. At a mean evaporating temperature of −26° C. the expansion valve was fully opened.

85% R125 (R600a): Approximately 3.56 kg were charged into the liquid receiver. Five data points were obtained between the mean evaporating temperatures of −44.5° C. and −28° C.

R407c: Approximately 3.59 kg were charged into the liquid receiver. Five data points were obtained between mean evaporating temperatures of −32° C. to −20° C.

70% R125: Approximately 3.5 kg were charged into the liquid receiver. Five data points were obtained between the mean evaporating temperatures of −32° C. to −21° C.

R404A: Approximately 3.51 kg were charged into the liquid receiver. Five data points were obtained between the mean evaporating temperatures of −33° C. to −25° C.

Results

The results obtained are summarized in Tables 3-8. Mean Ev. Temp=Mean evaporation temperature; Air On Condenser=temperature of the air in the room that is blown over the air cooled condenser, measured just prior to the air bluwing over the condenser; Press=pressure.

Comments and Discussion on the Experimental Results

Graph 1 shows a comparison of capacities at a mean evaporating temperature of −30° C., compared to R404A. This evaporating temperature is considered to be fairly typical of where a low temperature refrigerant would be expected to operate. It can be seen that 85% R125 and 85% R125 (R600a) have a slightly better relative capacity than R404A, whereas the other refrigerants tested are poorer. R22 and 75% R125 are the next best. At this temperature R407c is the poorest, but it improves relatively as the mean evaporating temperature increases. Generally, there is an improvement in cooling capacity as the R125 content increases.

Graph 2 shows the COP results obtained. It shows that 85% R125 and 85% R125 (R600a) give the best efficiency at −30° C. and are the only refrigerants better than R404A.

Graphs 3 and 4 show the capacity and COP for any given refrigerant relative to R22. These again show the similarity of 85% R125 and 85% R125 (R600a) to R404A, which are all 5-10% up on R22.

The preferred formulations are therefore 85% R125 and 85% R125 (R600a). Assuming that n-butane and isobutane have the same GWP as methane (21). This is 22% less than that of R404a and 23% less than that of R507.

The preferred compositions are 85% w/w R125, 11.5% w/w R134a and 3.5% w/w butane or isobutane. These have a vapour pressure-temperature relationship very close to that of R404A. For example, at −30° C. the R404A liquid has a vapour pressure of 0.209 MPa (30.3 psia) and the preferred compositions have a vapour pressure above the liquid of 0.218 MPa (31.6 psi) for butane and 0.223 MPa (32.3 psia) for isobutane i.e. only 4-6% higher.

TABLES

TABLE 1

Details of test refrigerants

| Description | Composition |
| --- | --- |
| 70% R125 | R125/134a/600 (70.0/26.5/3.5) |
| 75% R125 | R125/134a/600 (75.0/21.5/3.5) |
| 85% R125 | R125/134a/600 (85.0/11.5/3.5) |
| 85% R125 (R600a) | R125/134a/600a (85.0/11.5/3.5) |
| R407C | R32/125/134a (23.0/24.0/52.0) |
| R404A | R125/143a/134a (44.1/51.9/4.0) |

TABLE 2

Results of the experimental SVP measurements and the glide from REFPROP6

| Description | SVP equation (see note 1) | Glide equation (see note 2) |
| --- | --- | --- |
| 70% R125 | y = −2357.53678x +13.02249 | y = −0.02391x + 3.22225 |
| | | $R^2$ = 0.99786 |
| 75% R125 | y = −2318.71536x + 12.93301 | y = −0.02122x + 2.84478 |
| | $R^2$ = 1.00000 | $R^2$ = 0.99704 |
| 85% R125 | y = −2318.35322x + 12.98687 | y = −0.01305x + 1.85013 |
| | $R^2$ = 0.99998 | $R^2$ = 0.99456 |
| 85% R125 (R600a) | y = −2307.282362x + 12.964359 | y = −0.0157x + 1.7337 |
| | $R^2$ = 0.999973 | $R^2$ = 0.998 |
| R407C (3) | y = −2422.08237x + 13.27060 | y = −0.000118x2 − 0.027343x + 6.128020 |
| | | $R^2$ = 0.998575 |
| R404A | y = −2367.62611x + 13.14935 | y = −0.005014x + 0.547125 |
| | $R^2$ = 0.99994 | $R^2$ = 0.995941 |
| R22 | (see note 4) | Not applicable |

Notes:
(1) In this equation x = 1/T where T is the bubble point in Kelvin: y = ln(p), where p is the saturated vapour pressure in psia.
(2) In this equation x = t, where t is liquid temperature (bubble point) in degree C. and y = glide in deg C. at the bubble point temperature.
(3) The data used was from Refprop, but was in agreement with that from the Ashrae handbook and from ICI.
(4) The vapour pressures for R22 were obtained from the Ashrae handbook by intepolation.

TABLE 3

R22 CONDENSING AT 40° C. IN LT-CALORIMETER

| Mean Ev. Temp | Discharge Temp | Air On Condenser | Discharge Absolute Press (MPa) | Condensing Temp | Evaporator Absolute Inlet Press (MPa) | Evap Temp BUBBLE | Evap Temp DEW | Compressor Power kwh | Capacity (Heat Input kwh) | C.O.P. | Evap. Superheat |
|---|---|---|---|---|---|---|---|---|---|---|---|
| −33.0 | 159.5 | 24.2 | 1.532 | 40.0 | 0.144 | −33.0 | −33.0 | 1.339 | 1.224 | 0.91 | 8.5 |
| −30.2 | 153.1 | 18.9 | 1.545 | 40.3 | 0.163 | −30.2 | −30.2 | 1.412 | 1.367 | 0.97 | 8.5 |
| −27.8 | 152.4 | 20.6 | 1.538 | 40.1 | 0.180 | −27.8 | −27.8 | 1.486 | 1.653 | 1.11 | 8.5 |
| −27.5 | 156.6 | 24.4 | 1.516 | 39.5 | 0.182 | −27.5 | −27.5 | 1.482 | 1.704 | 1.15 | 7.7 |
| −25.4 | 155.6 | 24.3 | 1.547 | 40.4 | 0.199 | −25.4 | −25.4 | 1.606 | 2.020 | 1.26 | 8.4 |
| −25.0 | 155.2 | 24.2 | 1.538 | 40.1 | 0.205 | −25.0 | −25.0 | 1.660 | 2.139 | 1.29 | 8.8 |
| −22.5 | 154.5 | 26.3 | 1.551 | 40.5 | 0.223 | −22.5 | −22.5 | 1.686 | 2.323 | 1.38 | 7.9 |
| −20.7 | 150.5 | 24.7 | 1.555 | 40.6 | 0.238 | −20.7 | −20.7 | 1.729 | 2.526 | 1.46 | 8.1 |

Note: All temperatures are in °C

TABLE 4

70% R125 (69.98% R125/26.51% R134a/3.51% R600) CONDENSING AT 40° C. IN LT-CALORIMETER (ITS 7694)

| Mean Ev. Temp | Discharge Temp | Air On Condenser | Discharge Absolute Press (MPa) | Condensing Temp | Evaporator Absolute Inlet Press (MPa) | Evap Temp BUBBLE | Evap Temp DEW | Compressor Power kwh | Capacity (Heat Input kwh) | C.O.P. | Evap. Superheat |
|---|---|---|---|---|---|---|---|---|---|---|---|
| −32.4 | 117.7 | 23.4 | 1.697 | 40.5 | 0.160 | −34.4 | −30.4 | 1.302 | 1.148 | 0.88 | 8.3 |
| −29.6 | 115.6 | 24.8 | 1.690 | 40.3 | 0.180 | −31.6 | −27.6 | 1.384 | 1.389 | 1.00 | 7.9 |
| −26.1 | 108.8 | 21.2 | 1.686 | 40.2 | 0.207 | −28.1 | −24.2 | 1.499 | 1.768 | 1.18 | 8.0 |
| −23.5 | 108.1 | 23.4 | 1.691 | 40.3 | 0.230 | −25.4 | −21.6 | 1.589 | 2.046 | 1.29 | 8.2 |
| −21.5 | 107.3 | 24.4 | 1.691 | 40.3 | 0.248 | −23.4 | −19.6 | 1.657 | 2.260 | 1.36 | 8.0 |

Note: All temperatures are in °C.

TABLE 5

75% R125 (75.02% R125/21.48% R134a/3.50% R600) CONDENSING AT 40° C. IN LT-CALORIMETER (ITS 7616)

| Mean Ev. Temp | Discharge Temp | Air On Condenser | Discharge Absolute Press (MPa) | Condensing Temp | Evaporator Absolute Inlet Press (MPa) | Evap Temp BUBBLE | Evap Temp DEW | Compressor Power kwh | Capacity (Heat Input kwh) | C.O.P. | Evap. Superheat |
|---|---|---|---|---|---|---|---|---|---|---|---|
| −30.7 | 115.2 | 25.0 | 1.736 | 40.0 | 0.187 | −32.4 | −28.9 | 1.421 | 1.403 | 0.99 | 8.1 |
| −27.8 | 112.4 | 25.7 | 1.746 | 40.3 | 0.210 | −29.5 | −26.0 | 1.476 | 1.644 | 1.11 | 7.7 |
| −25.0 | 110.9 | 28.1 | 1.733 | 39.9 | 0.234 | −26.7 | −23.3 | 1.610 | 1.981 | 1.23 | 7.6 |
| −23.3 | 108.0 | 26.7 | 1.731 | 39.9 | 0.250 | −25.0 | −21.6 | 1.653 | 2.190 | 1.33 | 7.6 |

Note: All temperatures are in °C.

TABLE 6

85% R125 (85.05% R125/11.45% R134a/3.50% R600) CONDENSING AT 40° C. IN LT-CALORIMETER (ITS 7677)

| Mean Ev. Temp | Discharge Temp | Air On Condenser | Discharge Absolute Press (MPa) | Condensing Temp | Evaporator Absolute Inlet Press (MPa) | Evap Temp BUBBLE | Evap Temp DEW | Compressor Power kwh | Capacity (Heat Input kwh) | C.O.P. | Evap. Superheat |
|---|---|---|---|---|---|---|---|---|---|---|---|
| −31.4 | 109.3 | 20.3 | 1.839 | 40.1 | 0.197 | −32.6 | −30.3 | 1.462 | 1.501 | 1.03 | 8.1 |
| −28.7 | 109.8 | 22.6 | 1.844 | 40.2 | 0.219 | −29.8 | −27.6 | 1.567 | 1.724 | 1.10 | 8.4 |
| −26.6 | 107.2 | 23.1 | 1.823 | 39.7 | 0.238 | −27.7 | −25.5 | 1.626 | 1.970 | 1.21 | 7.8 |
| −25.2 | 103.9 | 20.4 | 1.845 | 40.2 | 0.251 | −26.3 | −24.1 | 1.688 | 2.190 | 1.30 | 8.2 |

Note: All temperatures are in °C.

TABLE 7

R407C (23.02% R32/25.04% R125/51.94% R134a) CONDENSING AT 40° C. IN LT-CALORIMETER (ITS 7361)

| Mean Ev. Temp | Discharge Temp | Air On Condenser | Discharge Absolute Press (MPa) | Condensing Temp | Evaporator Absolute Inlet Press (MPa) | Evap Temp BUBBLE | Evap Temp DEW | Compressor Power kwh | Capacity (Heat Input kwh) | C.O.P. | Evap. Superheat |
|---|---|---|---|---|---|---|---|---|---|---|---|
| −32.4 | 135.3 | 19.8 | 1.735 | 39.7 | 0.147 | −35.9 | −28.9 | 1.287 | 0.974 | 0.76 | 7.6 |
| −29.4 | 133.8 | 18.9 | 1.738 | 39.7 | 0.167 | −32.9 | −26.0 | 1.428 | 1.405 | 0.98 | 7.7 |
| −25.7 | 132.4 | 20.1 | 1.746 | 39.9 | 0.196 | −29.1 | −22.3 | 1.499 | 1.736 | 1.16 | 7.8 |
| −23.0 | 130.8 | 20.8 | 1.733 | 39.6 | 0.218 | −26.4 | −19.6 | 1.650 | 2.190 | 1.33 | 7.6 |
| −19.6 | 129.0 | 22.5 | 1.761 | 40.3 | 0.250 | −22.9 | −16.2 | 1.774 | 2.649 | 1.49 | 8.0 |

Note: All temperatures are in °C.

TABLE 8

R404A (44% R125/52% R143a/4% R134a) CONDENSING AT 40° C. IN LT-CALORIMETER (ITS 7726)

| Mean Ev. Temp | Discharge Temp | Air On Condenser | Discharge Absolute Press (MPa) | Condensing Temp | Evaporator Absolute Inlet Press (MPa) | Evap Temp BUBBLE | Evap Temp DEW | Compressor Power kwh | Capacity (Heat Input kwh) | C.O.P. | Evap. Superheat |
|---|---|---|---|---|---|---|---|---|---|---|---|
| −33.0 | 123.4 | 23.7 | 1.831 | 39.7 | 0.182 | −33.4 | −32.7 | 1.405 | 1.291 | 0.92 | 8.0 |
| −31.2 | 120.5 | 23.1 | 1.829 | 39.7 | 0.196 | −31.5 | −30.8 | 1.472 | 1.473 | 1.00 | 7.6 |
| −29.6 | 118.1 | 22.8 | 1.824 | 39.6 | 0.210 | −29.9 | −29.2 | 1.522 | 1.624 | 1.07 | 7.7 |
| −26.9 | 118.2 | 25.1 | 1.850 | 40.1 | 0.233 | −27.3 | −26.6 | 1.641 | 1.910 | 1.16 | 8.1 |
| −24.7 | 112.6 | 21.4 | 1.865 | 40.5 | 0.254 | −25.0 | −24.3 | 1.740 | 2.272 | 1.31 | 8.1 |

Note: All temperatures are in °C.

TABLE 9

85% R125 (R600a) (85% R125/11.45% R134a/3.50% R600a) CONDENSING AT 40° C. IN LT-CALORIMETER

| Mean Ev. Temp | Discharge Temp | Air On Condenser | Discharge Press (psig) | Condensing Temp | Evaporator Inlet Press (psig) | Evap Temp BUBBLE | Evap Temp DEW | Compressor Power kwh | Capacity (kW) | C.O.P. | Evap. Superheat |
|---|---|---|---|---|---|---|---|---|---|---|---|
| −44.5 | 115.4 | 24.5 | 256.0 | 40.2 | 2.0 | −45.8 | −43.3 | 1.022 | 0.313 | 0.31 | 8.5 |
| −39.9 | 116.6 | 24.6 | 254.7 | 40.0 | 5.8 | −41.1 | −38.7 | 1.137 | 0.623 | 0.55 | 7.9 |
| −36.2 | 114.2 | 21.8 | 254.2 | 39.9 | 9.3 | −37.3 | −35.0 | 1.319 | 1.025 | 0.78 | 8.3 |
| −31.8 | 107.4 | 19.1 | 251.6 | 39.5 | 14.1 | −32.9 | −30.7 | 1.462 | 1.482 | 1.01 | 8.5 |
| −28.0 | 106.5 | 20.8 | 254.0 | 39.9 | 18.8 | −29.1 | −26.9 | 1.605 | 1.827 | 1.14 | 8.3 |
| −24.0 | 101.8 | 19.7 | 253.5 | 39.8 | 24.4 | −25.0 | −22.9 | 1.763 | 2.336 | 1.33 | 7.9 |

Note: All temperatures are in °C.

What is claimed is:

1. A nonflammable refrigerant composition consisting of:
   (a) pentafluoroethane in an amount from 83% to 90% based on the weight of the composition;
   (b) a mixture of 1,1,1,2-tetrafluoroethane and 1,1,2,2-tetrafluoroethane in an amount from 7.5% to 15% by weight based on the weight of the composition; and
   (c) a component that is in an amount of from 1% to 4% by weight based on the weight of the composition which is at least 70% isobutane and the remainder of the component is selected from the group consisting of n-butane, isobutane, n-pentane, isopentane, dimethyl ether, ethylmethyl ether and mixtures thereof.

2. The composition according to claim 1, wherein the isobutane is an amount from 3% to 4% by weight based on the weight of the composition.

3. A refrigeration apparatus containing, as refrigerant, a composition as claimed in claim 1.

4. A nonflammable refrigerant composition consisting of:
   (a) pentafluoroethane in an amount from 83% to 88% based on the weight of the composition;
   (b) a mixture of 1,1,1,2-tetrafluoroethane and 1,1,2,2-tetrafluoroethane in an amount from 7.5% to 15% by weight based on the weight of the composition;
   (c) a component that is in an amount of from 1% to 4% by weight based on the weight of the composition which is at least 70% isobutane and the remainder of the component is selected from the group consisting of n-butane, isobutane, n-pentane, isopentane, dimethyl ether, ethylmethyl ether and mixtures thereof; and
   (d) an additional component selected from a lubricant or an additive selected from the group consisting of extreme pressure additives, antiwear additives, oxidation and thermal stability improvers, corrosion inhibitors, improvers, viscosity index improvers, pour point depressants, detergents, anti-foaming agents, and viscosity adjusters.

5. The composition according to claim 4 in which component (c) is only isobutane and present in an amount of about 3.5% by weight based on the weight of the composition.

6. A refrigeration apparatus containing, as refrigerant, a composition as claimed in claim 4.

7. A nonflammable refrigerant composition consisting of:
(a) pentafluoroethane in an amount from 83% to 88% based on the weight of the composition;
(b) a mixture of 1,1,1,2-tetrafluoroethane and 1,1,2,2-tetrafluoroethane in an amount from 7.5% to 15% by weight based on the weight of the composition;
(c) a component that is in an amount of from 1% to 4% by weight based on the weight of the composition which is at least 70% isobutane and the remainder of the component is selected from the group consisting of n-butane, isobutane, n-pentane, isopentane, dimethyl ether, ethylmethyl ether and mixtures thereof;
(d) an additional component selected from a lubricant or an additive selected from the group consisting of extreme pressure additives, antiwear additives, oxidation and thermal stability improvers, corrosion inhibitors, improvers, viscosity index improvers, pour point depressants, detergents, anti-foaming agents, and viscosity adjusters; and
(e) an additional hydrofluorocarbon in an amount not exceeding 5% by weight and wherein the hydrofluorocarbon is selected from the group consisting of trifluoromethane and difluoromethane.

8. The nonflammable composition according to claim 4 or 7, wherein at least one lubricant is selected from the group consisting of a lubricant selected from the group consisting of mineral oils, alkylbenzene lubricants, synthetic lubricants, and fluorinated oils and mixtures thereof.

9. A refrigeration apparatus containing, as refrigerant, a composition as claimed in claim 7.

10. A nonflammable refrigerant composition consisting of:
(a) pentafluoroethane in an amount from 83% to 88% based on the weight of the composition;
(b) a mixture of 1,1,1,2-tetrafluoroethane and 1,1,2,2-tetrafluoroethane in an amount from 7.5% to 15% by weight based on the weight of the composition;
(c) a component that is in an amount of from 1% to 4% by weight based on the weight of the composition, which is at least 70% isobutane and the remainder of the component is selected from the group consisting of n-butane, isobutane, n-pentane, isopentane, dimethyl ether, ethylmethyl ether and mixtures thereof; and
(d) an additional hydrofluorocarbon in an amount not exceeding 5% by weight wherein the hydrofluorocarbon is selected from the group consisting of trifluoromethane and difluoromethane.

* * * * *